US007554239B2

(12) United States Patent
Suzuki

(10) Patent No.: US 7,554,239 B2
(45) Date of Patent: Jun. 30, 2009

(54) DYNAMO-ELECTRIC MACHINE AND VEHICULAR AIR BLOWER HAVING THE SAME

(75) Inventor: Akihiko Suzuki, Toyohashi (JP)

(73) Assignee: ASMO Co., Ltd., Shizuoka-pref. (JP)

(*) Notice: Subject to any disclaimer, the term of this patent is extended or adjusted under 35 U.S.C. 154(b) by 434 days.

(21) Appl. No.: 11/589,945

(22) Filed: Oct. 31, 2006

(65) Prior Publication Data

US 2007/0108864 A1 May 17, 2007

(30) Foreign Application Priority Data

Nov. 14, 2005 (JP) ............................ 2005-329335

(51) Int. Cl.
*H01R 39/38* (2006.01)
*H02K 13/00* (2006.01)

(52) U.S. Cl. ........................ 310/239; 310/245; 310/242

(58) Field of Classification Search ................. 310/239, 310/242, 245, 246
See application file for complete search history.

(56) References Cited

U.S. PATENT DOCUMENTS 5,717,271 A * 2/1998 Aoki et al. .................. 310/242
6,922,003 B2 * 7/2005 Uchida ....................... 310/239
7,067,946 B2 6/2006 Noda et al.
2004/0164643 A1 * 8/2004 Ortt et al. .................. 310/239
2006/0192449 A1 8/2006 Noda et al.

FOREIGN PATENT DOCUMENTS

JP 406315251 * 11/1994 ................ 310/239

* cited by examiner

*Primary Examiner*—Quyen P Leung
*Assistant Examiner*—Leda Pham
(74) *Attorney, Agent, or Firm*—Posz Law Group, PLC

(57) ABSTRACT

Each brush box, which receives a corresponding brush, has a contact wall. The contact wall becomes deformable when the temperature of the contact wall reaches a predetermined temperature. A radially outer end surface of the brush is tilted relative to the contact wall, so that the brush is urged against the contact wall by a compression coil spring, which urges the brush against a commutator of an armature. Upon energization of the armature, when the temperature of the brush reaches a predetermined temperature, an urging force of the spring, which is conducted to the contact wall through the brush, causes deformation of the contact wall to disengage a radially inner end of the brush from the commutator.

11 Claims, 6 Drawing Sheets

DYNAMO-ELECTRIC MACHINE AND VEHICULAR AIR BLOWER HAVING THE SAME

CROSS REFERENCE TO RELATED APPLICATION

This application is based on and incorporates herein by reference Japanese Patent Application No. 2005-329335 filed on Nov. 14, 2005.

BACKGROUND OF THE INVENTION

1. Field of the Invention

The present invention relates to a dynamo-electric machine and a vehicular air blower having the same.

2. Description of Related Art

For example, as recited in Japanese Unexamined Patent Publication No. 2005-29038 (corresponding to U.S. Pat. No. 7,067,946 B2 and U.S. 2006/0192449 A1), there is known a vehicular air blower, which includes a fan rotated by a direct current motor to blow air into a passenger compartment of a vehicle. In an armature of the direct current motor of the above vehicular air blower, electric current is supplied to the armature from brushes, which are slidably engaged with a commutator that is fixed to a rotatable shaft of the armature. When the electric current is supplied to the armature through the brushes, the fan, which is fixed to the rotatable shaft, is rotated together with the rotatable shaft.

In the above direct current motor, at the time of supplying the electric current to the armature, when the rotation of the rotatable shaft is locked or when an excess load is applied to the rotatable shaft, excessive electric current is supplied to the armature through the brushes. In such a case, the brushes may generate abnormal heat due to the excess electric current to cause burnout of the direct current motor. Thus, in order to limit the burnout caused by the abnormal heat generation of the brushes, a protective device, such as a fuse, is provided in the direct current motor or on an upstream side of an electric power source of the direction current motor, so that the supply of the electric current to the armature is stopped whenever the excessive electric current is supplied to the armature.

In a case where the fuse malfunctions due to some reason, the excessive electric current may possibly be supplied to the armature through the brushes. Thus, in general, in addition to the fuse, the direct current motor further includes a safety device, which stops the supply of electric current from the brushes to the commutator when the excessive electric current is supplied to the armature. One such safety device includes a circuit. In this circuit, the electric current, which is supplied to the armature, is measured, and the measured electric current is compared with a predetermined threshold value. When the measured electric current is larger than the threshold value, the circuit stops the supply of electric current to the armature. Furthermore, in order to reduce occurrence of the damage caused by the burnout, the resin components of the direct current motor are made of flame-retarded resin.

When the safety device is provided to the direct current motor in addition to the fuse, a size of the direct current motor becomes large, or a structure of the direct current motor becomes complicated. Furthermore, the flame-retarded resin is generally expensive. Thus, when such expensive flame-retarded resin is used, the manufacturing cost of the direct current motor is disadvantageously increased. The above disadvantages are not limited to the direct current motor of the vehicular air blower and are common to dynamo-electric machines, which are energized through brushes.

SUMMARY OF THE INVENTION

The present invention addresses the above disadvantages. Thus, it is an objective of the present invention to alleviate at least one of the above disadvantages.

To achieve the objective of the present invention, there is provided a dynamo-electric machine, which includes an armature, a brush, an urging means, a brush box and a pressing means. The armature includes a rotatable shaft and a commutator. The rotatable shaft is rotatably supported. The commutator is fixed to the rotatable shaft. The brush is slidably engaged with the commutator at a radially inner end of the brush to energize the armature. The urging means is for urging the brush against the commutator. The brush box has an opening on a commutator side of the brush box and slidably receives the brush. The brush box includes a deformable side wall, which becomes deformable at a predetermined temperature. The pressing means is for pressing the brush against the deformable side wall of the brush box such that a pressing force of the pressing means, which is conducted to the deformable side wall through the brush, causes deformation of the deformable side wall to disengage the radially inner end of the brush from the commutator when the temperature of the deformable side wall reaches the predetermined temperature due to a temperature increase in the brush. A vehicular air blower may have the above dynamo-electric machine and a fan driven by the above dynamo-electric machine.

To achieve the objective of the present invention, there is also provided a dynamo-electric machine, which includes an armature, a brush, a brush box and a disengaging means. The armature includes a commutator. The brush is slidably engaged with the commutator to energize the armature. The brush box slidably receives the brush. The brush box includes a deformable side wall, which is made of a thermoplastic material and becomes deformable at a predetermined temperature. The disengaging means is for disengaging the brush from the commutator by deforming the deformable side wall of the brush box through the brush and displacing the brush in a deforming direction of the deformable side wall when the temperature of the deformable side wall is increased to the predetermined temperature by heat generated in the dynamo-electric machine. A vehicular air blower may have the above dynamo-electric machine and a fan driven by the above dynamo-electric machine.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

One embodiment of the present invention will be described with reference to the accompanying drawings.

Figure 1:
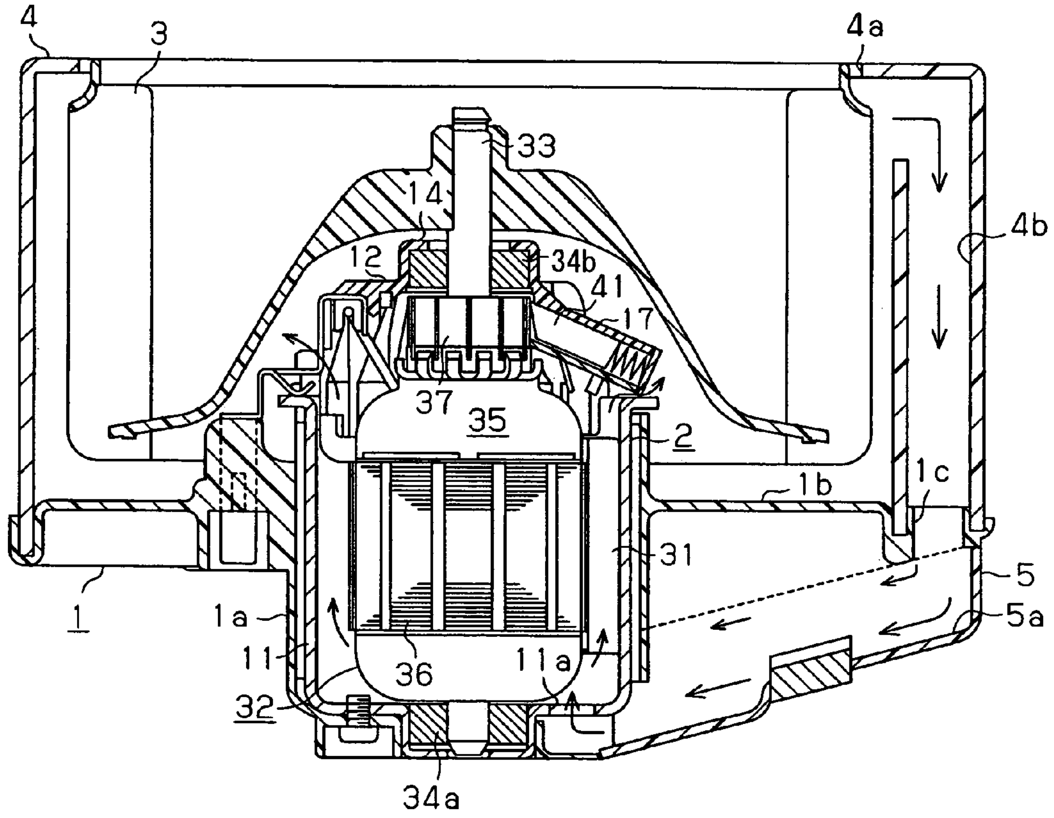
FIG. 1 is a schematic cross sectional view of a vehicular air blower according to an embodiment of the present invention.

FIG. 1 is a cross sectional view of an air blower (a vehicular air blower) of a vehicle according to an embodiment of the present invention. As shown in FIG. 1, the vehicular air blower includes a motor holder 1 made of synthetic resin, a motor main body 2 and a fan 3. The motor main body 2 is held by the motor holder 1. The fan 3 is rotated by the motor main body 2.

A holding tubular portion 1*a* of the motor holder 1 is shaped into a generally cylindrical body having a bottom wall. A flange 1*b* extends radially outward from an axial intermediate part of the holding tubular portion 1*a*. An axial communication hole 1*c*, which extends vertically in FIG. 1, is formed in an outer peripheral edge part of the flange 1*b*. A blower case 4, which surrounds the fan 3, is installed to a top surface of the flange 1*b*. An air intake opening 4*a* is formed in a top part of the blower case 4 and is communicated with an air intake duct (not shown), which takes air from inside or outside of a passenger compartment of the vehicle. Furthermore, an air outlet opening (not shown) is formed in a peripheral wall surface of the blower case 4 and is communicated with an air outlet duct (not shown). A split flow duct 4*b* is formed in the blower case 4. The split flow duct 4*b* takes a part of the air, which is drawn through the air intake opening 4*a*, as cooling air and guides it to the communication hole 1*c*.

Furthermore, an air passage member 5 is installed to the motor holder 1 such that the air passage member 5 covers a lower end of the communication hole 1*c* and closely contacts an outer peripheral surface of the holding tubular portion 1*a* and a bottom surface of the flange 1*b*. The air passage member 5 forms an air passage 5*a*. The air passage 5*a* conducts the air, which is drawn through the communication hole 1*c* and serves as cooling air, into an interior of the motor main body 2.

The motor main body 2 is formed as a direct current motor. A yoke 11 of the motor main body 2, which is fitted into the holding tubular portion 1*a*, is shaped into a cup-shaped body having a bottom wall. A through hole 11*a* is formed through the bottom wall of the yoke 11 to conduct the cooling air from the air passage 5*a* into an interior of the yoke 11. Furthermore, a generally inverted bowl shaped housing 12 is placed at the opening of the yoke 11.

Figure 2:
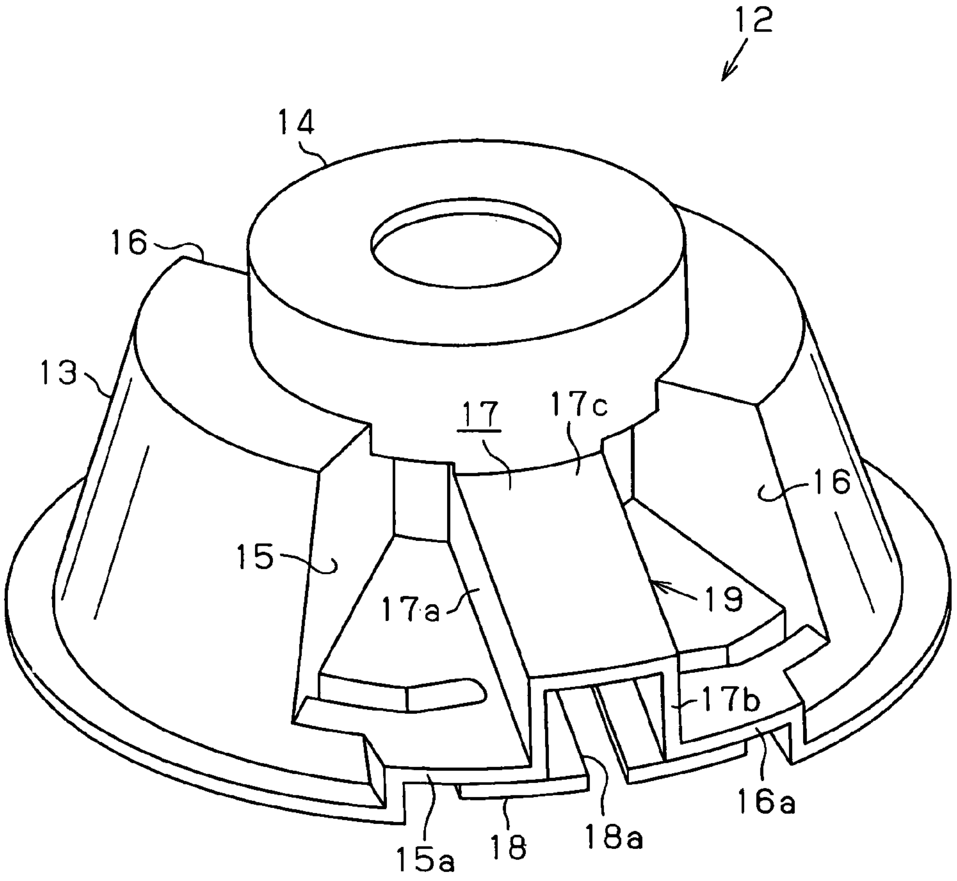
FIG. 2 is a perspective view of a housing of the vehicular air blower.

As shown in FIG. 2, the housing 12 includes a cover portion 13, which is shaped into a generally frustum shaped tubular body. Furthermore, a bearing holding portion 14 is formed integrally at an upper end of the cover portion 13. The bearing holding portion 14 is shaped into a generally cylindrical body that has a top end wall. A first installation recess 15 and a second installation recess 16 are formed in an outer surface of the cover portion 13. The first installation recess 15 and the second installation recess 16 are spaced from each other in a circumferential direction of the cover portion 13 and are paired. Actually, two pairs of the first and second installation recesses 15, 16 are provided in such a manner that the first pair of the first and second installation recesses 15, 16 are circumferentially displaced 180 degrees from the second pair of the first and second installation recesses 15, 16.

In each pair of the first and second installation recesses 15, 16, a brush holding portion 17, which has a generally rectangular cross section, is formed between the first installation recess 15 and the second installation recess 16 to extend radially outward. When the two brush holding portions 17 (only one is shown in FIG. 2) are viewed in the axial direction, the two brush holding portions 17 are diametrically opposed to each other such that center lines of the two brush holding portions 17 are aligned with a single straight line, which extends perpendicular to a central axis of a commutator 37. Each brush holding portion 17 includes two side walls 17*a*, 17*b* and a contact wall 17*c*. The two side walls (circumferential end walls) 17*a*, 17*b* are opposed to each other in the circumferential direction of the cover portion 13. The contact wall 17*c* is formed integrally at upper ends of the two side walls 17*a*, 17*b* and serves as a modified side wall (a deformable side wall). When each brush holding portion 17 is viewed from the interior of the housing 12, the brush holding portion 17 extends in a radial direction of the cover portion 13. Furthermore, each brush holding portion 17 has the generally rectangular cross section when it is viewed in the radial direction. Furthermore, each of the side walls 17*a*, 17*b* and the contact wall 17*c* is formed to have a uniform wall thickness in a range of 1 mm to 4 mm (i.e., 1 mm≦wall thickness≦4 mm). A circumferential space between the two side walls 17*a*, 17*b* is uniform along a radial extension of the side walls 17*a*, 17*b*.

Figure 3:
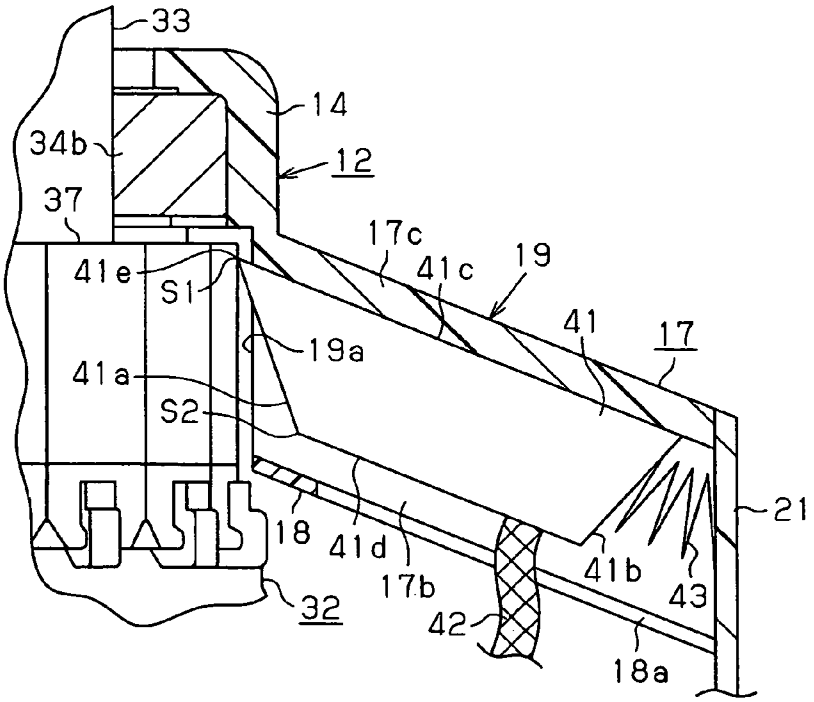
FIG. 3 is a schematic cross sectional view showing a brush box of the vehicular air blower before deformation.

A holding plate 18 is fixed to bottom walls 15*a*, 16*a* of the first and second installation recesses 15, 16 to make each brush holding portion 17 into the generally tubular form. The holding plate 18 covers the lower part of the brush holding portion 17 from the interior side (the lower side in FIG. 2) of the cover portion 13. A circumferential width of the holding plate 18, which is measured in the circumferential direction of the cover portion 13, is larger than a circumferential width of the brush holding portion 17, which is measured in the circumferential direction of the cover portion 13. Furthermore, a radial length of the holding plate 18, which is measured in the radial direction of the cover portion 13, is generally equal to a radial extent of the brush holding portion 17, which is measured in the radial direction of the cover portion 13 (FIG. 3). The holding plate 18 is fixed to the bottom walls 15*a*, 16*a* of the first and second installation recesses 15, 16 in such a manner that a radially inner end and an radially outer end of the holding plate 18 generally coincide with a radially inner end and a radially outer end, respectively, of the brush holding portion 17. Furthermore, in the holding plate 18, a receiving groove (receiving slit) 18*a* is formed in an axially opposing part of the holding plate 18, which is axially opposed to the brush holding portion 17. In the holding plate 18, the receiving groove 18*a* extends in the radial direction of the cover portion 13 all the way to a point, which is located radially outward of and is adjacent to the radially inner end of the holding plate 18. The holding plate 18 and the brush holding portion 17 constitute a brush box 19.

The above housing 12 is made of polybutylene terephthalate (PBT) and is formed through injection molding. When the housing 12, which is made of the PBT, is heated to the temperature equal to or greater than 220 degrees Celsius, the housing 12 becomes thermally deformable. When the housing 12 is installed to the opening of the yoke 11, a closing plate 21 is placed at a radially outer end of the brush holding portion 17 to close a radially outer opening of the brush box 19, as shown in FIG. 3.

As shown in FIG. 1, magnets 31 are fixed to an inner peripheral surface of the yoke 11, and an armature 32 is placed in a space, which is surrounded by the yoke 11 and the housing 12. A rotatable shaft 33 of the armature 32 is rotatably supported by bearings 34*a*, 34*b*, which are fixed to a bottom wall of the yoke 11 and the bearing holding portion 14 of the housing 12, respectively. One end of the rotatable shaft 33 projects upwardly from an upper end of the bearing holding portion 14. The fan 3 is fixed to the distal end of the rotatable shaft 33, which projects upwardly from the upper end of the bearing holding portion 14. A core 36, around which a winding 35 is wound, is fixed to a portion of the rotatable shaft 33, which is between the center and the lower end of the rotatable shaft 33. The core 36 is radially opposed to the magnets 31. Furthermore, the commutator 37, which is shaped into a generally cylindrical form, is fixed to a portion of the rotatable shaft 33, which is between the center and the upper end of the rotatable shaft 33. The commutator 37 is received in the housing 12. Furthermore, as shown in FIG. 3, an outer peripheral surface of the commutator 37 is radially opposed to a radially inner opening 19*a* of each brush box 19.

A generally rectangular parallelepiped shaped brush 41 is slidably received in each brush box 19 to slidably engage the commutator 37. The brush 41 is received in the brush box 19 in such a manner that a longitudinal direction of the brush 41 generally coincides with the radial direction of the housing 12. A radially inner end surface 41*a* of the brush 41, which is radially opposed to the commutator 37, is tilted in such a manner that a space between the radially inner end surface 41*a* of the brush 41 and the outer peripheral surface of the commutator 37 progressively increases from an upper end of the radially inner end surface 41*a* to a lower end of the radially inner end surface 41*a* in the axial direction of the commutator 37. Furthermore, between two sides S1, S2 of the radially inner end surface 41*a* of the brush 41, which are parallel to each other and are opposed to each other in the axial direction of the commutator 37, the side (the upper side in FIG. 3) S1, which is closer to the contact wall 17*c* in comparison to the other side (the lower side in FIG. 3) S2, contacts the commutator 37. A radially outer end surface 41*b* of the brush 41 is tilted in such a manner that the radially outer end surface 41*b* forms an acute angle with respect to a top surface 41*c* of the brush 41, which is directly opposed to the contact wall 17*c*. Furthermore, a bottom surface 41*d* of the brush 41, which is directly opposed to the holding plate 18, is electrically connected with one end of a corresponding power supply pigtail 42. The pigtail 42 is received through the receiving groove 18*a*, which is formed in the holding plate 18, in such a manner that the brush 41, to which the pigtail 42 is connected, is radially movable. A length of the pigtail 42 is set to permit movement of the brush 41, which results in disengagement of the brush 41 from the commutator 37. The other end of the pigtail 42 is connected to an external power source device through a connection terminal (not shown).

Furthermore, a compression coil spring 43 is interposed between the radially outer end surface 41*b* of the brush 41 and the closing plate 21. The compression coil spring 43 serves an urging means for urging the brush 41 against the commutator 37. Since the radially outer end surface 41*b* of the brush 41 is tilted to form the acute angle relative to the top surface 41*c* of the brush 41, the compression coil spring 43 urges the brush 41 against the commutator 37 and also urges the brush 41 against the contact wall 17*c*. Thereby, the compression coil spring 43 also serves as a pressing means for pressing the brush 41 against the contact wall 17*c*. In this way, the top surface 41*c* of the brush 41 contacts the contact wall 17*c*. Furthermore, the brush 41 is urged by the compression coil spring 43, and thereby a radially inner end 41*e* of the brush 41 is engaged with the commutator 37.

In the motor main body 2, the space, which permits the movement of the brush 41 that results in the disengagement of the brush 41 from the commutator 37, is provided around the brush holding portion 17.

In the vehicular air blower, which is constructed in the above described manner, when the electric current is supplied to the armature 32, i.e., when the electric current is supplied to the winding 35 through the brushes 41 and the commutator 37 to energize the armature 32, the armature 32 is rotated, thereby resulting in the rotation of the fan 3 together with the rotatable shaft 33 of the armature 32. When the fan 3 is rotated through the rotation of the rotatable shaft 33, the gas (the air), which is taken through the intake opening, is guided radially outward and is discharged through the outlet opening to blow the air from the air blower. Specifically, through the rotation of the fan 3, the air inside or outside of the passenger compartment of the vehicle is drawn into the air blower and is blown out of the air blower toward the interior of the passenger compartment.

Figure 4:
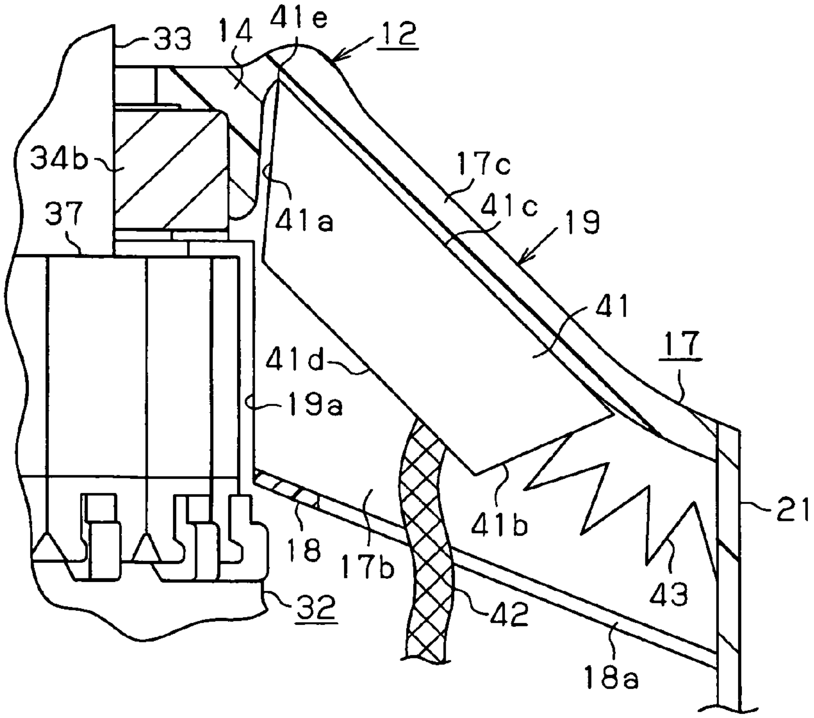
FIG. 4 is a schematic cross sectional view showing the brush box of the vehicular air blower in a deformed state.
Figure 5:
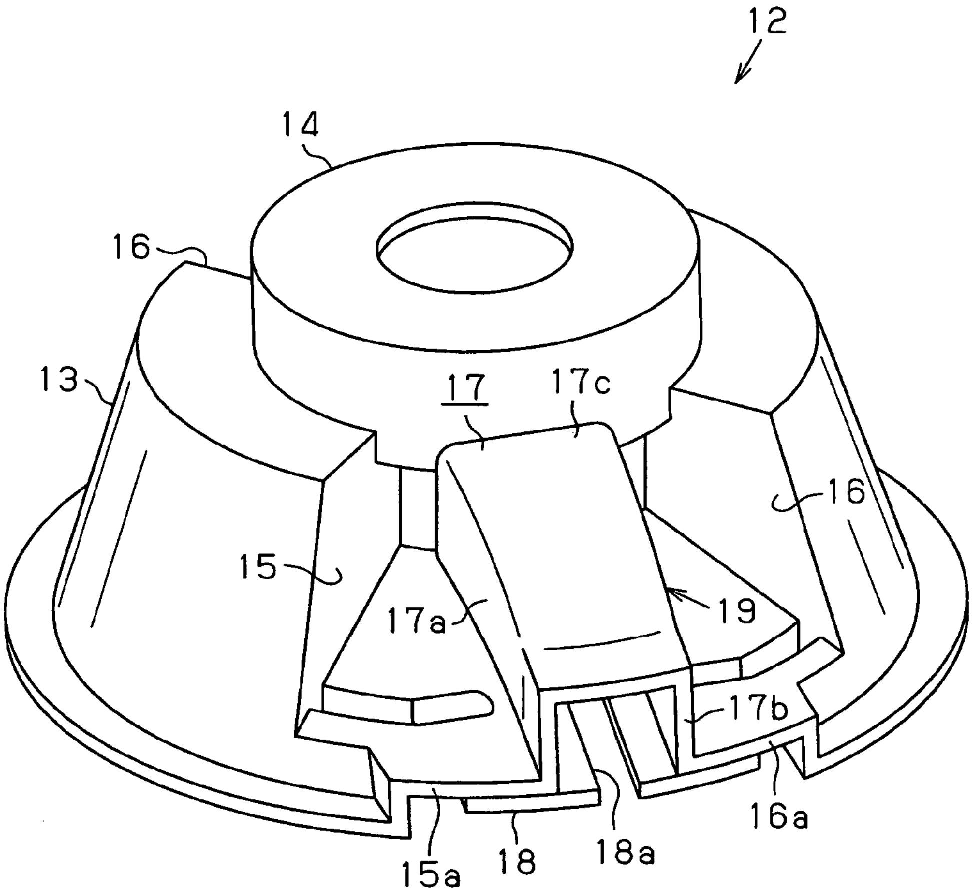
FIG. 5 is a perspective view of the housing, which includes the deformed brush boxes.

Then, for example, when a load is applied to the fan 3 due to some reason to cause application of a load to the rotatable shaft 33 to limit the rotation of the rotatable shaft 33, the electric current, which is supplied from the brushes 41 to the commutator 37, is increased to cause heat generation from the brushes 41. At that time, the radially inner end 41*e* of each brush 41, which is engaged with the commutator 37, tends to have the highest heat. Then, the heat of the brush 41 is conducted to the contact wall 17*c*, which contacts the top surface 41*c* of the brush 41, and thereby the temperature of the contact wall 17*c* reaches about 220 degrees Celsius. At that time, as shown in FIGS. 4 and 5, the contact wall 17*c* is deformed at a stage that is before the resin material of the contact wall 17*c* is carbonated and is ignited. Specifically, the contact wall 17*c* is curved by the urging force of the compression coil spring 43, which is conducted through the brush 41, so that the distance between the holding plate 18 and the contact wall 17*c* is increased. At this time, the brush 41 is urged against the contact wall 17*c* by the compression coil spring 43 to contact the contact wall 17*c*. Thus, due to the deformation of the contact wall 17*c*, the radially inner end 41*e* of the brush 41, which is engaged with the commutator 37, is moved in a direction away from the commutator 37 in a deforming direction of the contact wall 17*c*. As a result, the brush 41 is disengaged from the commutator 37, and thereby the electric current from the brush 41 to the commutator 37 is stopped. In this way, the compression coil spring 43 also serves as a disengaging means of the present invention.

Furthermore, the rotating commutator 37 also urges the brush 41 against the side wall 17*a*, which is located on a trailing side (a rear side) of the brush holding portion 17 (the brush box 19) in the rotational direction of the commutator 37. Here, it should be noted that the term "trailing side" of the brush holding portion 17 is defined as a side opposite from a leading side (a front side) of the brush holding portion 17 where the side 17*b* is located. In other words, the trailing side of the brush holding portion 17 is located on the rear side of the leading side of the brush holding portion 17 in the rotational direction of the commutator 37. With the above construction, as shown in FIG. 5, when the temperature of the side wall 17*a* is increased about 220 degrees Celsius due to the temperature increase of the brush 41, the side wall 17*a* is deformed and is curved by the urging force received from the brush 41 such that the distance between the side wall 17*a* and the side wall 17*b*, which are circumferentially opposed to each other, is increased. Simultaneously with the deformation of the side wall 17*a*, the brush 41 is moved in the circumferential direction by the frictional force between the radially inner end 41*e* of the brush 41 and the commutator 37. As described above, in addition to the contact wall 17*c*, the side wall 17*a* also functions to cause the disengagement of the brush 41 from the commutator 37 at the time of abnormal heat generation of the brush 41.

As described above, the present embodiment provides the following advantages.

(1) The brush 41 is urged against the contact wall 17*c* by the urging force of the compression coil spring 43, so that the brush 41 contacts the contact wall 17*c*. Therefore, at the time of supplying the electric current to the armature 32, when the brush 41 is heated, the heat of the brush 41 is conducted to the contact wall 17*c*. Then, when the contact wall 17*c*, which is heated to about 220 degrees Celsius, is deformed by the urging force of the compression coil spring 43 that is conducted through the brush 41, the brush 41 is moved such that the radially inner end 41*e* of the brush 41 is spaced from the commutator 37 due to the fact that the brush 41 is urged against the contact wall 17*c* by the compression coil spring 43. As a result, the brush 41 is disengaged from the commutator 37, and thereby the electric current from the brush 41 to the commutator 37 is stopped. The brush box 19 has the contact wall 17*c*, which becomes deformable upon reaching the predetermined temperature, and the brush 41 is urged against the contact wall 17*c*. With this construction, at the time of increasing the temperature of the brush 41, the electric current from the brush 41 to the commutator 37 can be advantageously stopped. Therefore, it is not required to provide an additional safety device in addition to the fuse to limit the burnout of the motor main body 2, which is caused by the abnormal heat generation of the brushes 41. Furthermore, in the motor main body 2, the fuse, which limits the burnout of the motor main body 2, may possibly be eliminated. Furthermore, at the time of increasing the temperature of the brush 41, the contact wall 17*c* is deformed to limit the burnout of the motor main body 2, so that it is not required to use the flame-retarded resin. Therefore, the occurrence of the burnout of the motor main body 2 caused by the abnormal heat generation of the brushes 41 can be advantageously reduced with the inexpensive and simple structure. Furthermore, it is possible to reduce the occurrence of the burnout of the vehicular air blower, which has the above motor main body 2. In addition, it is possible to limit an increase in the size of the motor main body 2 with the above structure, which limits the burnout of the motor main body 2.

(2) In the brush 41, the radially outer end surface 41*b* is tilted to form the acute angle with respect to the top surface 41*c*, so that the brush 41 is urged against the contact wall 17*c* by the urging force of the compression coil spring 43. Thus, when the compression coil spring 43, which urges the brush 41 against the commutator 37, is also used as the component, which urges the brush 41 against toe contact wall 17*c*, it is not required to provide a separate urging component, such as a spring, which urges the brush 41 against the contact wall 17*c*. As a result, the structure, which reduces the occurrence of the burnout of the motor main body 2 caused by the abnormal heat generation of the brush 41, can be advantageously simplified.

(3) Between the two sides S1, S2, which are parallel to each other and are provided in the radially inner end surface 41*a* of the brush 41, the side S1, which is closer to the contact wall 17*c* in comparison to the side S2, is engaged with the commutator 37. In the brush 41, the engaging portion of the brush 41, which is engaged with the commutator 37, tends to generate the high heat. Therefore, when the side S1 of the radially inner end surface 41*a* of the brush 41, which is closer to the contact wall 17*c*, is constructed to engage with the commutator 37, the engaging portion of the brush 41, which tends to generate the high heat in the brush 41, is placed closer to the contact wall 17*c*. As a result, in the state where the brush 41 generates the abnormal heat, the deformation of the contact wall 17*c* can be initiated at the earlier time point when the side S1 of the radially inner end surface 41*a* of the brush 41, which is closer to the contact wall 17*c* in comparison to the side S2 of the radially inner end surface 41*a*, is engaged with the commutator 37 in comparison to the case where the side S2 is engaged with the commutator 37.

(4) The housing 12, which has the brush holding portions 17, is made of the PBT, which is the thermoplastic resin, so that the housing 12 can be easily formed through, for example, the injection molding. Furthermore, the brush holding portions 17 and the bearing holding portion 14 are formed integrally, so that the number of required components and the number of required assembling steps of the motor main body 2 can be reduced.

(5) The length of each pigtail 42 is set to permit the movement of the brush 41 at the time of deformation of the contact wall 17*c*. Thus, at the time of the abnormal heat generation of the brush 41, the movement of the brush 41 will not be limited by the pigtail 42.

(6) Each of the side walls 17*a*, 17*b* and the contact wall 17*c* is formed to have the uniform wall thickness in the range of 1 mm to 4 mm (i.e., 1 mm≦wall thickness≦4 mm). When the wall thicknesses of the side walls 17*a*, 17*b* and of the contact wall 17*c* becomes less than 1 mm, the durability may be disadvantageously reduced, and the bothersome noise may be generated between the brush 41 and the walls 17*a*, 17*b*, 17*c* due to the vibration of the motor main body 2. In contacts, when the wall thickness of the contact wall 17*c* is increased beyond 4 mm, the contact wall 17*c* may not be easily deformed at the time of abnormal heat generation of the brush 41. Thus, when the wall thickness of each of the side walls 17*a*, 17*b* and the contact wall 17*c* is made uniform in the range of 1 mm to 4 mm, the satisfactory durability of each brush box 19 is achieved, and the generation of the bothersome noise between the brush 41 and the walls 17*a*-17*c* can be advantageously limited. Also, with the above wall thickness of each of the side walls 17*a*, 17*b* and the contact wall 17*c*, at the time of abnormal heat generation of the brush 41, the contact wall 17*c* can be easily deformed.

(7) For example, in a case where the side wall(s) 17*a*, 17*b* is deformed to disengage the brush 41 from the commutator 37, in order to provide a space, which allows such deformation of the side wall(s) 17*a*, 17*b*, the layout of the components of the motor main body 2 may need to be changed. However, the substantial part of the armature 32 except the portion of the rotatable shaft 33 is received in the space, which is surrounded by the yoke 11 and the housing 12. Thus, in the motor main body 2 of the present embodiment, none of the other components of the motor main body 2 is placed on the top of the contact wall 17*c*. Therefore, as in the present embodiment, when the contact wall 17*c*, on which the other components of the motor main body 2 are not placed, is formed to be deformable at the time of abnormal heat generation of the brush 41, it is easy to provide the space, which allows the deformation of the contact wall 17*c*. As a result, a degree of freedom in the designing of the shape of the housing 12 is not limited, and the movement of the side wall (e.g., the contact wall 17*c*) of the brush holding portion 17, which is urged by the brush 41, is not limited by the other components of the motor main body 2.

The above embodiment may be modified as follows.

In the above embodiment, the housing 12 (the brush holding portions 17) is made of the PBT. Alternatively, the housing 12 (the brush holding portions 17) may be made of any other appropriate thermoplastic resin other than the PBT. Furthermore, the housing 12 (the brush holding portions 17) may be made of any other suitable material, which has the thermoplasticity, other than the thermoplastic resin. Furthermore, as long as each contact wall 17*c*, which contacts the corresponding brush 41, is made of the thermoplastic resin, the other part of the housing 12 may be made of any other appropriate material other than the thermoplastic resin.

In the above embodiment, each of the side walls 17*a*, 17*b* and the contact wall 17*c* is formed to have the uniform wall thickness in the range of 1 mm to 4 mm (i.e., 1 mm≦wall thickness≦4 mm). However, it may be only required that at least the contact wall 17*c* is formed to have the wall thickness in the range of 1 mm to 4 mm. Thus, the walls 17*a*, 17*b* other than the contact wall 17*c* may have any other appropriate wall thickness.

Figure 6A:
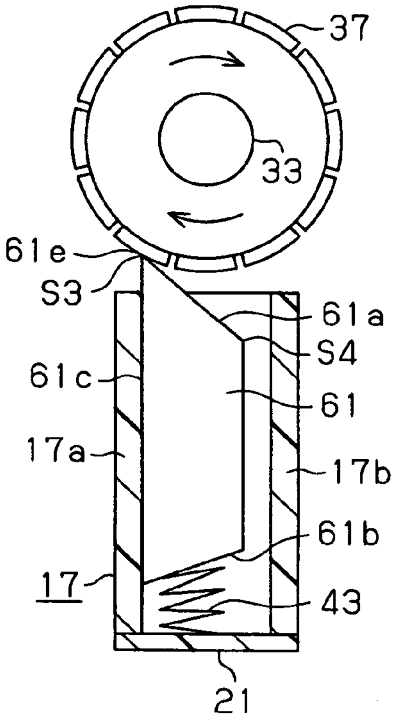
FIG. 6A is a descriptive view showing a state of a brush holding portion before deformation in a modification of the embodiment.
Figure 6B:
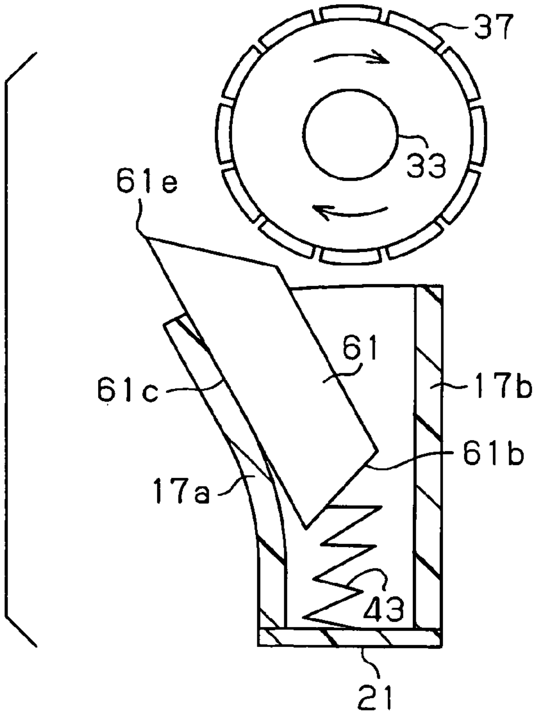
FIG. 6B is a descriptive view showing a state of the brush holding portion after the deformation in the modification of FIG. 6A.

In the above embodiment, the brush 41 is urged against the contact wall 17*c* by the urging force of the compression coil spring 43. Alternatively, as shown in FIG. 6A, which indicates a modification of the above embodiment, a brush 61 may be urged against the side wall 17*a*, which is arranged on the trailing side of the brush holding portion 17 in the rotational direction (indicated by arrows in FIG. 6A) of the commutator 37, by the urging force of the compression coil spring 43. In such a case, a radially outer end surface 61*b* of the brush 61 forms an acute angle with respect to a side surface 61*c* of the brush 61, which contacts the side wall 17*a* of the brush 41. Furthermore, with reference to the FIG. 6A, a radially inner end surface 61*a* of the brush 61 is formed in such a manner that a distance between the radially inner end surface 61*a* and the commutator 37 is progressively increased from the one side where the side wall 17*a* is located to the other side where the side wall 17*b* is located. Furthermore, between two sides S3, S4 of the radially inner end surface 61*a*, which are parallel to each other and are opposed to each other in the circumferential direction of the commutator 37, the side S3 (the left side in FIG. 6A), which is closer to the side wall 17*a* in comparison to the side S4, is engaged with the commutator 37. In this modification, at the time of abnormal heat generation, when the temperature of the side wall 17*a* is increased by the heat, which is conducted from the brush 61, to allow the thermoplastic deformation of the side wall 17*a*, the side wall 17*a* is deformed in such a manner that the distance between the side wall 17*b* and the side wall 17*a* is increased, by the urging force of the compression coil spring 43, which is conducted through the brush 61, as shown in FIG. 6B. At this time, the brush 61 is urged against the side wall 17*a* by the compression coil spring 43 to contact the side wall 17*a*. Thus, due to the deformation of the side wall 17*a*, a radially inner end 61*e* of the brush 61, which is engaged with the commutator 37, is moved in a direction away from the commutator 37. As a result, the brush 61 is disengaged from the commutator 37, and thereby the electric current from the brush 61 to the commutator 37 is stopped.

Figure 7A:
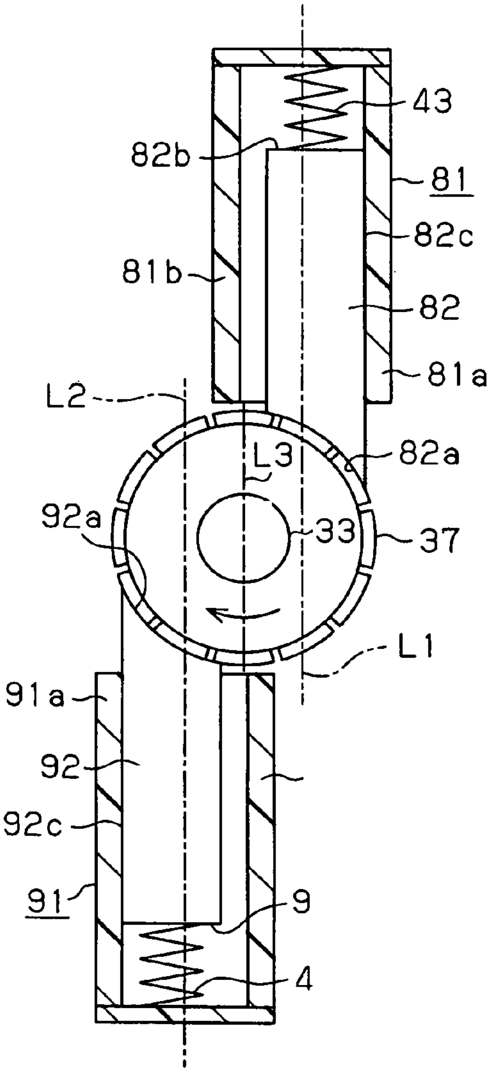
FIG. 7A is a descriptive view showing a state of a brush holding portion before deformation in another modification of the embodiment.
Figure 7B:
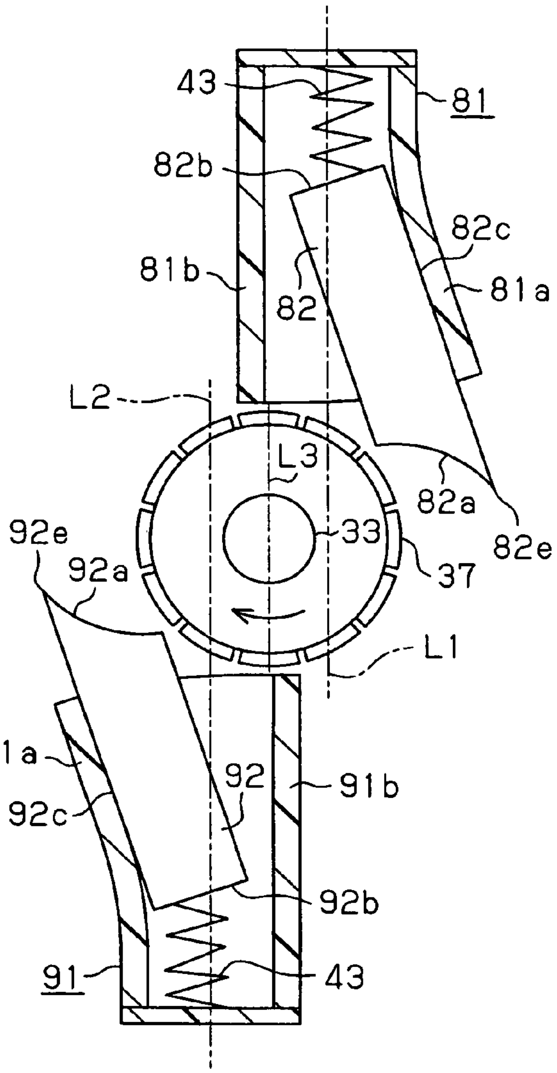
FIG. 7B is a descriptive view showing a state of the brush holding portion after the deformation in the modification of FIG. 7A.

In the above embodiment, when the two brush holding portions 17 are viewed in the axial direction, the two brush holding portions 17 are diametrically opposed to each other such that the center lines of the two brush holding portions 17 are aligned with the single straight line, which extends perpendicular to the central axis of the commutator 37. In place of the two brush holding portions 17 of the above embodiment, two brush holding portions 81, 91 may be alternatively formed, as shown in FIG. 7A, which shows another modification of the above embodiment. Specifically, as shown in FIG. 7A, when the two brush holding portions 81, 91 are viewed in the axial direction, a center line L1 of the brush holding portion 81 and a center line L2 of the brush holding portion 91 are parallel to each other and are not perpendicular to a single straight line L3, which extends perpendicular to the central axis of the commutator 37. Furthermore, brushes 82, 92, which are received in the brush holding portions 81, 91, are respectively formed such that a radially outer end surface 82*b*, 92*b* of the brush 82, 92 forms a right angle with respect to a side surface 82*c*, 92*c* of the brush 82, 92, which contacts a side wall 81*a*, 91*a* of the brush holding portion 81, 91, which is arranged on the trailing side of the brush holding portion 81, 91 in the rotational direction of the commutator 37. Here, a radially inner end surface 82*a*, 92*a* of the brush 82, 92 is formed into a curved surface, which is configured to generally coincide with the outer peripheral surface of the commutator 37. With the above construction, in comparison to the brush holding portions 17 of the above embodiment, each brush 82, 92 of this modification is urged further strongly toward the side wall 81*a*, 91*a* of the brush holding portions 81, 91 by the frictional force between the commutator 37 and the brush 82, 92. When the side wall 81*a*, 91*a* is heated by the heat conducted from the brush 82, 92 at the time of abnormal heat generation of the brush 82, 92 to allow the thermoplastic deformation of the side wall 81*a*, 91*a*, the side wall 81*a*, 91*a* is deformed by the urging force in the rotational direction of the commutator 37 transmitted through the brush 82, 92, so that a distance between the side wall 81*b*, 91*b* and the side wall 81*a*, 91*a* is increased, as shown in FIG. 7B. At this time, the brush 82, 92 is urged against the side wall 81*a*, 91*a* by the commutator 37. Thus, at the time of deformation of the side wall 81*a*, 91*a*, a radially inner end 82*e*, 92*e* of the brush 82, 92 is moved in a direction away from the commutator 37. As a result, the brush 82, 92 is disengaged from the commutator 37, and thereby the electric current from the brush 82, 92 to the commutator 37 is stopped.

In the structure shown in FIG. 7A, the radially outer end surface 82*b*, 92*b* of the brush 82, 92 may be modified to form an acute angle with respect to the side surface 82*c*, 92*c* of the brush 82, 92, which contacts the side wall 81*a*, 91*a* of the brush holding portion 81, 91. In this way, the urging force, which urges the brush 82, 92 against the side wall 81*a*, 91*a* of the brush holding portion 81, 91, is also applied from the compression coil spring 43, so that the side wall 81*a*, 91*a* may be more easily deformed at the time of abnormal heat generation of the brush 82, 92.

In the above embodiment, the radially inner end surface 41*a* of the brush 41 is tilted in such a manner that the space between the radially inner end surface 41*a* of the brush 41 and the outer peripheral surface of the commutator 37 progressively increases from the upper end of the radially inner end surface 41*a* to the lower end of the radially inner end surface 41*a* in the axial direction of the commutator 37. However, the present invention is not limited to this. For example, the radially inner end surface 41*a* of the brush 41 may be modified to form a right angle with respect to the top surface 41*c* of the brush 41.

In the above embodiment, the radially outer end surface 41*b* of the brush 41 forms the acute angle with respect to the top surface 41*c* of the brush 41, so that the brush 41 is urged against the contact wall 17*c* by the urging force of the compression coil spring 43. However, the structure for urging the brush 41 against the contact wall 17*c* is not limited to this. For example, the brush 41 may be urged against the contact wall 17*c* by, for example, a spring that is interposed between the bottom surface 41*d* of the brush 41 and the holding plate 18.

In the above embodiment, the brush 41 is urged against the commutator 37 by the urging force of the compression coil spring 43. However, the urging member, which urges the brush 41 against the commutator 37, is not limited to the compression coil spring 43 and may be, for example, a torsion coil spring.

The motor main body 2 may be provided in an apparatus other than the vehicular air blower. In the above embodiment, the motor main body 2 is described in detail as the exemplary case. Alternatively, the present invention may be implemented in any other appropriate dynamo-electric machine, in which electric current is supplied to an armature through brushes, other than the motor main body 2.

Additional advantages and modifications will readily occur to those skilled in the art. The invention in its broader terms is therefore not limited to the specific details, representative apparatus, and illustrative examples shown and described.

What is claimed is:

1. A dynamo-electric machine comprising:

an armature that includes:

a rotatable shaft, which is rotatably supported, and a commutator, which is fixed to the rotatable shaft;

a brush that is slidably engaged with the commutator at a radially inner end of the brush to energize the armature;

an urging means for urging the brush against the commutator;

a brush box that has an opening on a commutator side of the brush box and slidably receives the brush, wherein the brush box includes a deformable side wall, which becomes deformable at a predetermined temperature; and a pressing means for pressing the brush against the deformable side wall of the brush box such that a pressing force of the pressing means, which is conducted to the deformable side wall through the brush, causes deformation of the deformable side wall to disengage the radially inner end of the brush from the commutator when the temperature of the deformable side wall reaches the predetermined temperature due to a temperature increase in the brush.

2. The dynamo-electric machine according to claim 1, wherein:

the urging means constitutes the pressing means; and a radially outer end surface of the brush is tilted with respect to the deformable side wall of the brush box such that when the urging means applies the urging force to the radially outer end surface of the brush to radially inwardly urges the brush against the commutator, the brush is also urged against the deformable side wall of the brush box.

3. The dynamo-electric machine according to claim 1, wherein:

a radially inner end surface of the brush, which is opposed to the commutator, has two sides, which are opposed to each other and are parallel to each other; and one of the two sides of the radially inner end surface is placed adjacent to the deformable side wall of the brush box and is engaged with the commutator; and the other one of the two sides of the radially inner end surface is spaced from the deformable side wall of the brush box and also from the commutator.

4. The dynamo-electric machine according to claim 1, wherein:

the pressing means includes the commutator; and the deformable side wall of the brush box is located on a trailing side of the brush box in a rotational direction of the commutator.

5. The dynamo-electric machine according to claim 1, wherein the brush box is made of thermoplastic resin.

6. The dynamo-electric machine according to claim 1, wherein:

the brush is one of a plurality of generally identical brushes provided in the dynamo-electric machine; and the brush box is one of a plurality of generally identical brush boxes provided in the dynamo-electric machine.

7. The dynamo-electric machine according to claim 6, wherein the plurality of generally identical brush boxes is molded integrally from thermoplastic resin.

8. The dynamo-electric machine according to claim 1, wherein:

the deformable side wall of the brush box is made of polybutylene terephthalate; and a wall thickness of the deformable side wall of the brush box is in a range of 1 mm to 4 mm.

9. A vehicular air blower comprising:

the dynamo-electric machine recited in claim 1; and a fan that is fixed to the rotatable shaft of the armature and is driven by the dynamo-electric machine to draw air from inside or outside of a passenger compartment of a vehicle and to discharge the drawn air into the passenger compartment.

10. A dynamo-electric machine comprising:

an armature that includes a commutator;

a brush that is slidably engaged with the commutator to energize the armature;

a brush box that slidably receives the brush, wherein the brush box includes a deformable side wall, which is made of a thermoplastic material and becomes deformable at a predetermined temperature; and a disengaging means for disengaging the brush from the commutator by deforming the deformable side wall of the brush box through the brush and displacing the brush in a deforming direction of the deformable side wall when the temperature of the deformable side wall is increased to the predetermined temperature by heat generated in the dynamo-electric machine.

11. The dynamo-electric machine according to claim 10, wherein:

the thermoplastic material is polybutylene terephthalate; and a wall thickness of the deformable side wall of the brush box is in a range of 1 mm to 4 mm.

* * * * *